(12) United States Patent
Rolland et al.

(10) Patent No.: US 8,616,712 B2
(45) Date of Patent: Dec. 31, 2013

(54) NONSYMMETRIC OPTICAL SYSTEM AND DESIGN METHOD FOR NONSYMMETRIC OPTICAL SYSTEM

(75) Inventors: Jannick P. Rolland, Pittsford, NY (US); Kyle Fuerschbach, Rochester, NY (US)

(73) Assignee: University of Rochester, Rochester, NY (US)

( * ) Notice: Subject to any disclaimer, the term of this patent is extended or adjusted under 35 U.S.C. 154(b) by 93 days.

(21) Appl. No.: 13/429,771

(22) Filed: Mar. 26, 2012

(65) Prior Publication Data
US 2012/0243114 A1 Sep. 27, 2012

Related U.S. Application Data

(60) Provisional application No. 61/467,075, filed on Mar. 24, 2011, provisional application No. 61/546,230, filed on Oct. 12, 2011.

(51) Int. Cl.
*G02B 7/182* (2006.01)
(52) U.S. Cl.
USPC .......................................................... 359/858
(58) Field of Classification Search
USPC ............... 359/207.5, 720, 850, 857, 858, 868
See application file for complete search history.

(56) References Cited

U.S. PATENT DOCUMENTS

| | | | | |
|---|---|---|---|---|
| 4,443,067 A * | 4/1984 | Owen et al. | ................... | 359/675 |
| 6,313,951 B1 | 11/2001 | Manhart et al. | | |
| 6,639,733 B2 * | 10/2003 | Minano et al. | ................ | 359/728 |
| 7,130,131 B2 * | 10/2006 | Hakko et al. | .................. | 359/689 |
| 7,443,601 B2 * | 10/2008 | Yoshida et al. | ............... | 359/683 |
| 7,446,946 B2 * | 11/2008 | Yoshida et al. | ............... | 359/676 |
| 7,852,571 B2 * | 12/2010 | Yabe | ............................. | 359/708 |
| 8,331,043 B2 * | 12/2012 | Li | ................................. | 359/784 |
| 2006/0268282 A1 | 11/2006 | Evans et al. | | |
| 2010/0026978 A1 * | 2/2010 | Ruoff et al. | ..................... | 355/67 |
| 2010/0195070 A1 * | 8/2010 | Loering et al. | .................. | 355/52 |
| 2013/0201542 A1 * | 8/2013 | Wilcox et al. | ................. | 359/238 |

OTHER PUBLICATIONS

Nakano et al.; Configuration of an off-axis three-mirror system focused on compactness and brightness; Applied Optics, vol. 44, No. 5, Feb. 10, 2005; 776-783.
Rogers, John R.; A Comparison of Anamorphic, Keystone, and Zernike Surface Types for Aberration Correction, SPIE-OSA, vol. 7652, 76520B-1-765220B-8.

* cited by examiner

*Primary Examiner* — Frank Font
(74) *Attorney, Agent, or Firm* — William Greener; Bond, Schoeneck & King, PLLC

(57) ABSTRACT

A new family of truly nonsymmetric optical systems that exploit a new fabrication degree of freedom enabled by the introduction of slow-servos to diamond machining; surfaces whose departure from a sphere varies both radially and azimuthally in the aperture, and associated design method.

26 Claims, 8 Drawing Sheets

(a)

(b)

NONSYMMETRIC OPTICAL SYSTEM AND DESIGN METHOD FOR NONSYMMETRIC OPTICAL SYSTEM

RELATED APPLICATION DATA

The instant application claims priority to U.S. Provisional application Ser. No. 61/546,230 filed on Oct. 12, 2011 and U.S. Provisional application Ser. No. 61/467,075 filed on Mar. 24, 2011, the subject matters of which are incorporated herein by reference in their entireties.

GOVERNMENT FUNDING

This invention was made with support from the National Science Foundation under Agreement No. EECS-1002179. The government has certain rights in the invention.

BACKGROUND

1. Field of the Invention

Embodiments of the invention are generally directed to the field of optical systems; particularly to nonsymmetric imaging optical systems and, more particularly to nonsymmetric imaging optical systems having two or more phi ($\phi$)-polynomial surfaces, and methods for designing such nonsymmetric optical systems.

2. Related Art Discussion

Starting in the 1960s, motivated by the advance in LWIR detectors and the accompanying need for stray light control, a number of reflective, unobscured optical systems were designed, particularly, as concept designs for missile defense. While many of these systems appear to lack rotational symmetry, detailed analysis reveals that any successful design with a significant field of view was in fact based on a rotationally symmetric design with an offset aperture, a biased field, or both. This fact could be anticipated, as many systems that depart from rotational symmetry immediately display on-axis coma, where the axis for a nonsymmetric system is defined by the optical axis ray (OAR). While there are special configurations that eliminate axial coma, there are very few practical forms that do not reduce to a rotational symmetric form.

An example of a reflective, unobscured optical system is disclosed in Rodgers U.S. Pat. No. 5,309,276 which had the property of providing the largest planar, circular input aperture in the smallest overall spherical volume. The particular form embodied in the '276 patent is shown in FIG. 3. This optical design is a 9:1 afocal relay that operates over a 3° full FOV using four minors, and provides a real, accessible exit pupil, which was often a requirement in earlier infrared systems requiring cooled detectors. In use, it is coupled with a fast f/number refractive component in a dewar near the detector. It is based on using off-axis sections of rotationally symmetric conic minors that are folded into the spherical volume by using one fold mirror (mirror 3).

Many applications would exploit a larger FOV if it were available with usable performance. In addition, if an optical form could be developed at a fast enough f/number while maintaining a small envelope diameter, it becomes feasible to transition to an uncooled detector, thereby abandoning the need for the reimaging configuration, the external exit pupil, and the refractive component in the dewar. One method to achieving faster f/numbers is to implement a nonsymmetric optical surface.

When the symmetry constraint is removed, the traditional aberrations (spherical, coma, and astigmatism) develop a multi-nodal field dependence where there may now be multiple points in the FOV where a specific aberration type may go to zero. The seminal example is binodal astigmatism, first recognized by R. V. Shack, K. P. Thompson, "Influence of alignment errors of a telescope system," Proc. SPIE 251, 146-153 (1980). However, due to the fact that any tilted and decentered optical system with rotationally symmetric parent surfaces could not be corrected for axial coma, this theory has previously only been useful during the optical design of offset aperture and/or field biased optical systems.

Thompson, in 2005, described the new aberration field dependencies that arise in nodal aberration theory using a new display, the full field aberration display (K. P. Thompson, "Description of the third-order optical aberrations of near-circular pupil optical systems without symmetry," J. Opt. Soc. Am. A 22, 1389-1401 (2005)). The theory developed by Thompson is limited to tilted and decentered optical imaging systems made up of rotationally symmetric components, or offset aperture portions thereof. Recently, Schmid et al. (T. Schmid, J. P. Rolland, A. Rakich, and K. P. Thompson, "Separation of the effects of astigmatic figure error from misalignments using Nodal Aberration Theory (NAT)," Opt. Express 18, 17433-17447 (2010)) combined a nonsymmetric surface placed at an aperture stop with nodal aberration theory. With this new result and new fabrication methods where non-rotationally symmetric optical quality surfaces (known as $\phi$-polynomial surfaces) can be diamond turned, the optical designer is now able to target the third-order aberrations (spherical, coma, astigmatism) and their nodal behavior during optical design using tilted $\phi$-polynomial surfaces to create high performance imaging systems with no particular symmetry constraints.

The inventors recognize that solutions to the problems and challenges of designing and fabricating unobscured, truly nonsymmetric optical systems would be advantageous and beneficial. Moreover, the identification and use of a new fabrication degree of freedom enabled by the introduction of slow-servos to diamond machining, to provide faster optical systems with wider fields of view and minimal envelope size would provide further benefits and advantages.

SUMMARY

An embodiment of the invention is an unobscured, nonsymmetric optical system. The optical system includes only three optical components each having a respective optical surface n (n=1, 2, 3), optically coupled in a folded configuration, wherein each surface n has a center of curvature $C_n$, further wherein, in an unfolded configuration $C_n$ are off-axis, and further wherein at least two of the optical surfaces are $\phi$-polynomial surfaces. Various exemplary, non-limiting aspects of the embodied invention may include the following additional features and characteristics:

wherein the system is a three mirror imaging system characterized by $1.3 \leq f/\# \leq 4.0$ over a full diagonal field of view between 7 to 30 degrees in a spectral region from one micron (1 μm) to 12 μm;

characterized by an overall RMS wave front error less than $\lambda/100$ at 10 μm over the full field of view;

characterized by having a maximum envelope diameter that is less than four times a maximum pupil diameter of the system;

characterized by an entrance pupil up to 75 mm.

An embodiment of the invention is an unobscured, nonsymmetric optical system. The optical system includes only three optical components each having a respective optical surface n (n=1, 2, 3), wherein at least two of the optical surfaces are at least one of a tilted φ-polynomial surface and a decentered φ-polynomial surface. Various exemplary, non-limiting aspects of the embodied invention may include the following additional features and characteristics:

wherein the system is a three mirror imaging system characterized by 1.3≤f/#≤4.0 over a full diagonal field of view between 7 to 30 degrees in a spectral region from one micron (1 μm) to 12 μm;

characterized by an overall RMS wave front error less than λ/100 at 10 μm over the full field of view.

characterized by having a maximum envelope diameter that is less than four times a maximum pupil diameter of the system;

characterized by an entrance pupil up to 75 mm.

An embodiment of the invention is an unobscured, non-symmetric optical system. The optical system includes three optical components each having a respective optical surface n (n=1, 2, 3), optically coupled in a folded configuration, wherein each surface n has a center of curvature $C_n$, further wherein, in an unfolded configuration $C_n$ are off-axis, and further wherein at least two of the optical surfaces are φ-polynomial surfaces. Various exemplary, non-limiting aspects of the embodied invention may include the following additional features and characteristics:

wherein the system is a three mirror imaging system characterized by 1.3≤f/#≤4.0 over a full diagonal field of view between 7 to 30 degrees in a spectral region from one micron 1 μm to 12 μm;

characterized by an overall RMS wave front error less than λ/100 at 10 μm over the full field of view;

characterized by having a maximum envelope diameter that is less than four times a maximum pupil diameter of the system;

characterized by an entrance pupil equal to or greater than 14 millimeters (mm);

characterized by an entrance pupil up to 75 mm;

further comprising an uncooled image detector.

An embodiment of the invention is an unobscured, non-symmetric optical system. The optical system includes three optical components each having a respective optical surface n (n=1, 2, 3), wherein at least two of the optical surfaces are at least one of a tilted φ-polynomial surface and a decentered φ-polynomial surface. Various exemplary, non-limiting aspects of the embodied invention may include the following additional features and characteristics:

wherein the system is a three mirror imaging system characterized by 1.3≤f/#≤4.0 over a full diagonal field of view between 7 to 30 degrees in a spectral region from one micron 1 μm to 12 μm;

characterized by an overall RMS wave front error less than λ/100 at 10 μm over the full field of view;

characterized by having a maximum envelope diameter that is less than four times a maximum pupil diameter of the system;

characterized by an entrance pupil equal to or greater than 14 millimeters (mm);

characterized by an entrance pupil up to 75 mm;

further comprising an uncooled image detector.

An embodiment of the invention is a method for designing a nonsymmetric optical system. The method includes the steps of a) generating a well-corrected, on-axis, obscured optical system having rotationally symmetric optical surfaces and a field of view; b) tilting at least one of the optical surfaces to provide an unobscured form of the optical system; c) determining an aberration performance including one or more dominant aberrations of the unobscured optical system over the field of view, and further determining whether the one or more dominant aberrations are field constant or field dependent; and if the one or more dominant aberrations are field constant, then i) adding a phi (φ)-polynomial corresponding to the one or more dominant aberrations as a variable to an optical surface at or adjacent the aperture stop of the system; ii) optimizing the optical design; iii) evaluating an image quality metric; and iv) determining whether the optical system meets a performance specification and, if not, then reiterating steps (c-iv); or if the one or more dominant aberrations are field dependent, then v) adding a phi (φ)-polynomial corresponding to a radial order higher than the one or more dominant aberrations as variable to an optical surface that is away from the aperture stop of the system; vi) optimizing the optical design; vii) evaluating an image quality metric; and viii) determining whether the optical system meets a performance specification and, if not, then reiterating steps (c and v-viii). Various exemplary, non-limiting aspects of the embodied invention may include the following additional features and characteristics:

further comprising designing an optical system including three optical components each having a respective optical surface n (n=1, 2, 3), wherein at least two of the optical surfaces are at least one of a tilted φ-polynomial surface and a decentered φ-polynomial surface;

further comprising designing the imaging optical system wherein the system is a three minor imaging system characterized by 1.3≤f/#≤4.0 over a full diagonal field of view between 7 to 30 degrees in a spectral region from one micron 1 μm to 12 μm;

further comprising designing the imaging optical system characterized by an overall RMS wave front error less than λ/100 at 10 μm over the full field of view.

It is to be understood that both the foregoing general description and the following detailed description are merely exemplary of the embodied invention, and are intended to provide an overview or framework for understanding the nature and character of the invention embodiments as they are claimed. The accompanying drawings are included to provide a further understanding of the invention, and are incorporated in and constitute a part of this specification. The drawings illustrate various embodiments of the invention and together with the description serve to explain the principles and operation of the invention.

DETAILED DESCRIPTION OF EXEMPLARY EMBODIMENTS OF THE INVENTION

Reference will now be made in detail to the present exemplary embodiments of the invention, examples of which are illustrated in the accompanying drawings.

A φ-polynomial surface takes the form, $$z = F(\rho, \phi), \quad (1)$$

where the sag, z, is represented by a function that depends on the radial component, ρ, and the azimuthal component, φ, within the aperture of the part. Until recently, methods of fabrication have constrained the shape of optical surfaces to depend on the radial component only, that is, $z=F(\rho)$. This limitation has been a severe constraint in the optical design of unobscured optical systems. It is well known that when any powered optical surface in an optical system is tilted or decentered with respect to the optical axis, third-order coma will appear on-axis. While there are some special configurations where axial coma is eliminated (1:1 systems and systems that use the coma free pivot design principle), in general, the ubiquitous presence of axial coma in tilted and decentered systems has prevented access to a substantial family of optical design forms.

According to an exemplary embodiment of the invention, a φ-polynomial surface type that is used for an optical design is a Zernike polynomial surface described by the following equation, $$z = \frac{c\rho^2}{1 + \sqrt{1-(1+k)c^2\rho^2}} + \sum_{j=1}^{16} C_j Z_j, \quad (2)$$

where z is the sag of the surface, c is the vertex curvature, k is the conic constant, ρ is the radial component in the aperture, $Z_j$ is the $i^{th}$ FRINGE Zernike polynomial, and $C_j$ is the magnitude coefficient of $Z_j$. Each $Z_j$ is a polynomial in polar coordinates (R and φ), where R is a quantity normalized to a radius $R_{norm}$, that is, $R=/R_{norm}$. A table summarizing the FRINGE Zernike polynomials can be found in Synopsys Inc., "Zernike Polynomials," in *CODE V Reference Manual*, (2011), Volume IV, Appendix C.

Figure 1:
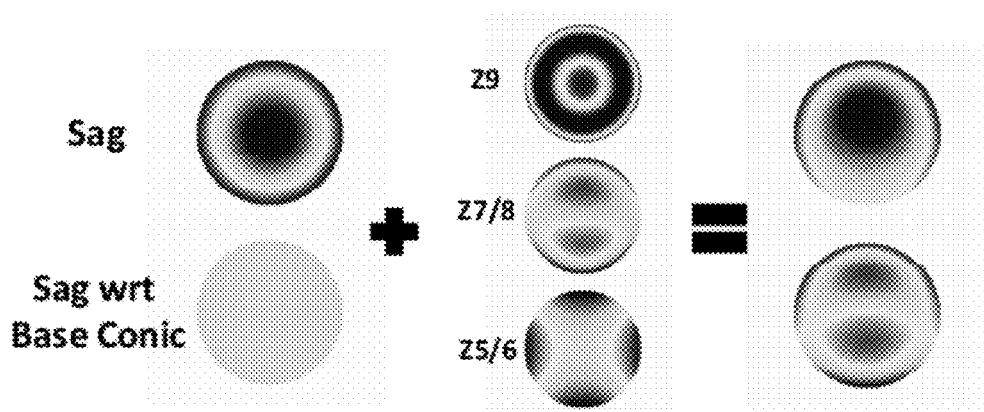
FIG. 1: The sag components of a powered FRINGE Zernike polynomial surface (right, top) when the base conic surface (left, top) is superimposed with contributions of, top to bottom: spherical aberration (Z9), coma (Z7, Z8), and astigmatism (Z5, Z6). When the sag is evaluated with respect to the base conic (right, bottom), the Zernike overlay on the surface can be seen directly, according to an illustrative aspect of the invention.

FIG. 1 illustrates the sag of a powered Zernike polynomial surface with spherical aberration (Z9), coma (Z7, Z8), and astigmatism (Z5, Z6), (in order of increasing field dependence). As can be seen from the resulting sag, the surface is asymmetric due to the comatic contribution and anamorphic due to the astigmatic contribution. When the sag is evaluated with respect to the base conic, as illustrated in the lower series of FIG. 1, the dominance of the comatic Zernike term appears, as is typical for this new design family.

The influence of a φ-polynomial surface in an optical system is highly dependent on its position relative to the (aperture) stop surface. In any optical system, there are apertures that limit the light that can pass through the optical system. The aperture that determines the cone of light that can be accepted by the optical system, thereby defining the limiting f/number, is the aperture stop. At this surface all field points will fill the entire aperture in a system without vignetting, which we assume here. This property combined with the constraint of a rotationally symmetric surface meant that in prior designs only spherical aberration is present on-axis and its contribution throughout the field is constant. In the embodied fabrication model and method, when φ-polynomial surfaces are placed at or near the stop surface, their contribution to the aberration function will also be field constant. The optical designer now has the ability to introduce field dependent aberrations on-axis and to remove on-axis coma introduced by a tilted surface.

Figure 2:
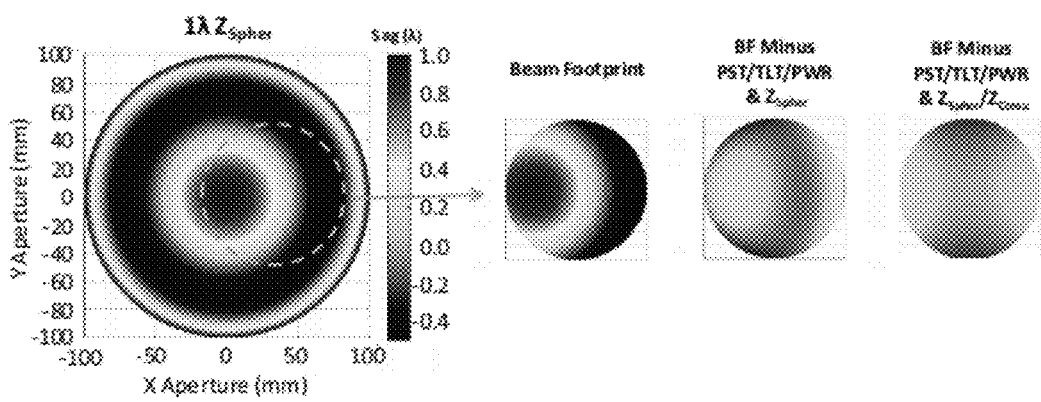
FIG. 2: Demonstration of a beam footprint (dashed circle) from an off-axis field point striking a plane surface with 1λ Zernike spherical (Z9). The Zernike composition of the beam footprint sub-region contains components of Zernike coma and astigmatism by sequentially subtracting Zernike spherical and coma, according to an illustrative aspect of the invention.
Figure 3:
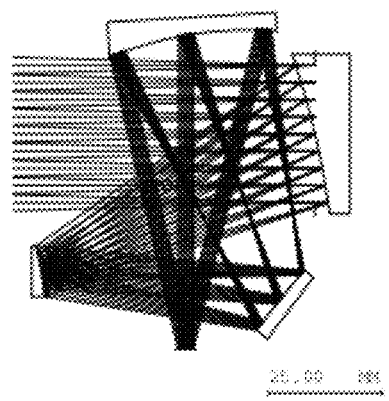
FIG. 3: Optical layout of a prior art system composed of three off-axis sections of rotationally symmetric mirrors and a fourth fold mirror, which at the time of its design provided the largest planar, circular input aperture in the smallest overall spherical volume for a gimbaled application.

For surfaces located away from the stop, the active area of the surface will be different for each field point, shrinking relative to the clear aperture and moving off center. FIG. 2 illustrates how a mix of spherical, coma, and astigmatism contribute to the wavefront of an off-axis field point as that field's beam footprint (dashed circle) is shifted and scaled on a surface with traditional rotationally symmetric departure, in this case a plane surface with 1λ of Zernike spherical (FRINGE term Z9). The ratio of each contribution is proportional to the initial full aperture amount and then scales with the offset. Similarly, for a φ-polynomial surface away from the stop, a mix of aberrations of lower radial order than the surface itself will contribute to the wavefront for each off-axis field point.

Optical Design with Tilted φ-polynomial Surfaces

Figure 4:
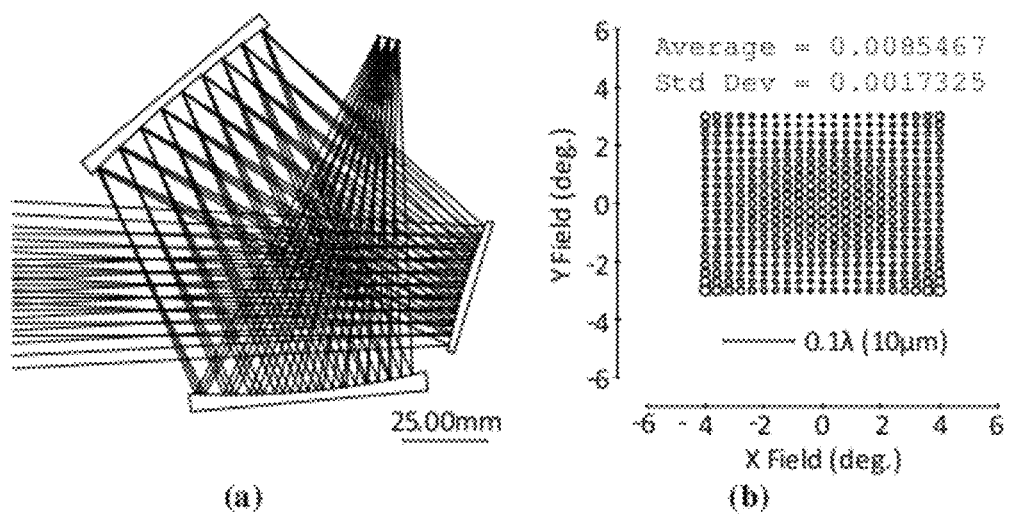
FIG. 4: a) Optical schematic of a nonsymmetric optical system; b) the RMS WFE of the final, optimized system, which is <λ/100 (0.01λ) at 10 μm over a 10° diagonal full FOV, according to an exemplary, illustrative embodiment of the invention.

FIG. 4a schematically illustrates an exemplary embodiment of a nonsymmetric, three mirror optical system 100 having two or more tilted φ-polynomial optical surfaces, characterized by f/1.9 with a 10° diagonal full FOV, developed using the embodied method utilizing nodal aberration theory for the optimization. The nonsymmetric optical design 100 has an overall RMS wavefront error (RMS WFE) of less than λ/100 at 10 μm over a 10° full FOV, where the overall RMS WFE is computed as the average plus one standard deviation RMS WFE for all field points.

Figure 5:
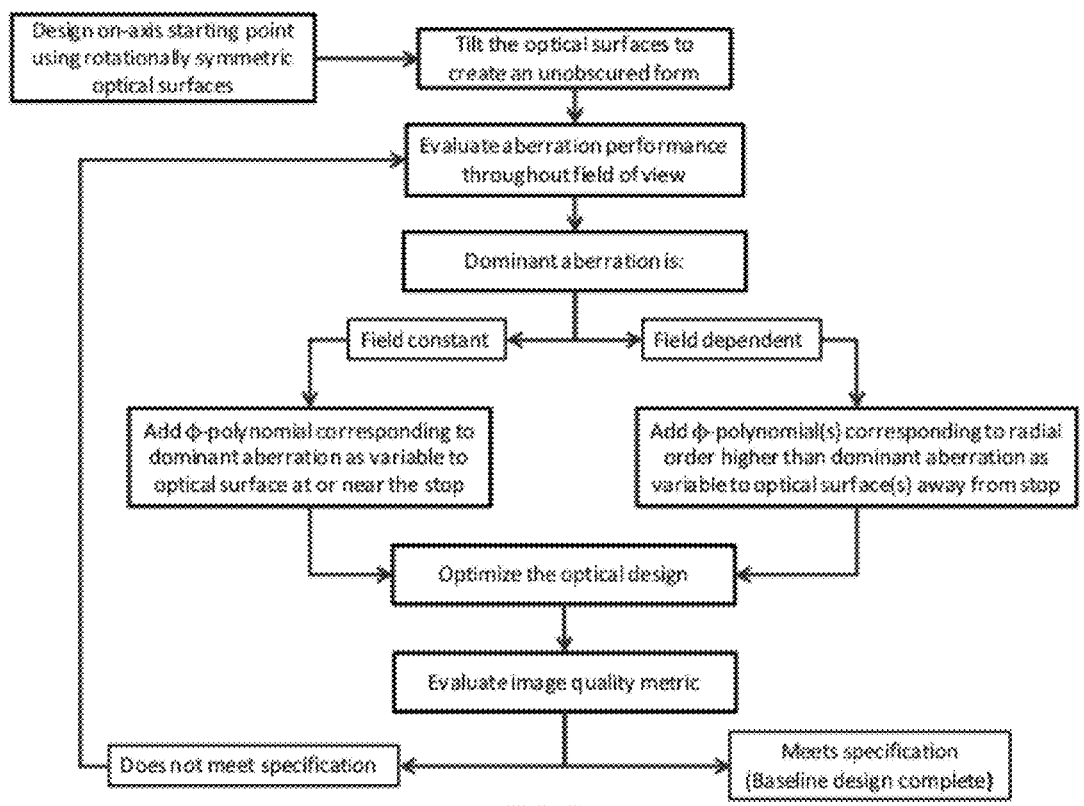
FIG. 5: Flow chart of a design method for a nonsymmetric optical system having one or more φ-polynomial surfaces, for both field constant and field dependent dominant aberrations, according to illustrative embodiments of the invention.
Figure 6:
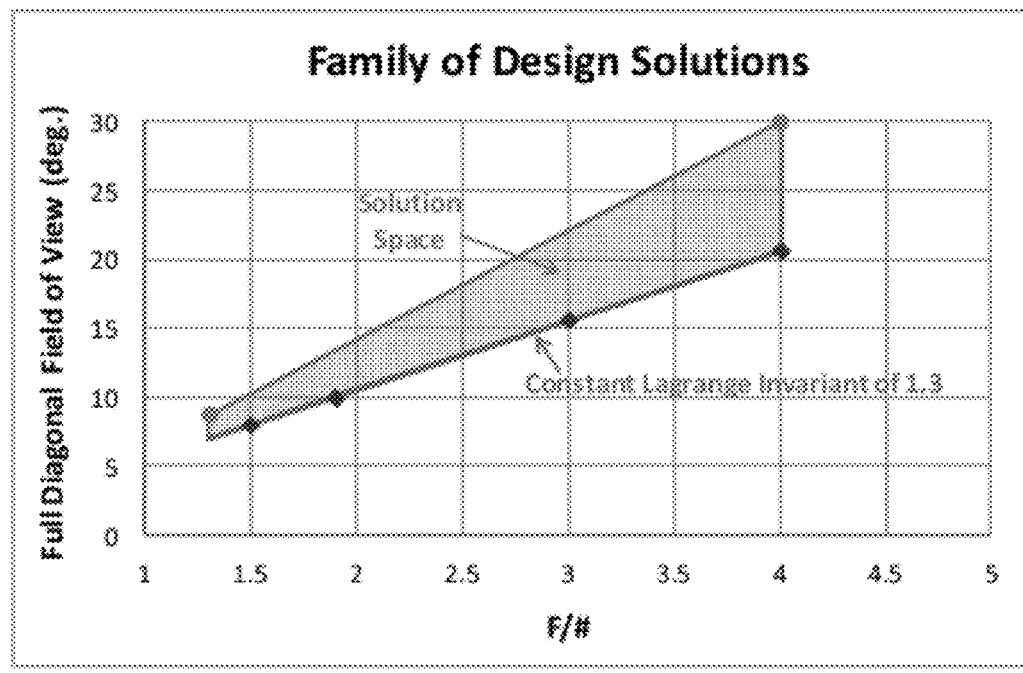
FIG. 6: Graphical depiction of a solution space enabled by the embodied design method.

A method for designing the nonsymmetric optical system 100 will now be described in relation to the flow chart steps displayed in FIG. 5. It will be appreciated that the embodied method is not limited to the design of the example optical system 100; rather, the embodied method enables the design of any refractive and reflective nonsymmetric systems employing phi-polynomial surfaces. This solution space for optical system 100 is based on the Lagrange Invariant, $$H = \frac{1}{2}D_{EP}\tan\left(\frac{FFOV}{2}\right), \quad (3)$$

where $D_{EP}$ is the diameter of the entrance pupil and FFOV is the full diagonal field of view. The embodied solution space ranges from f/# of 1.3 to 4 with FFOV ranging from 7 to 30 degrees.

Figure 7:
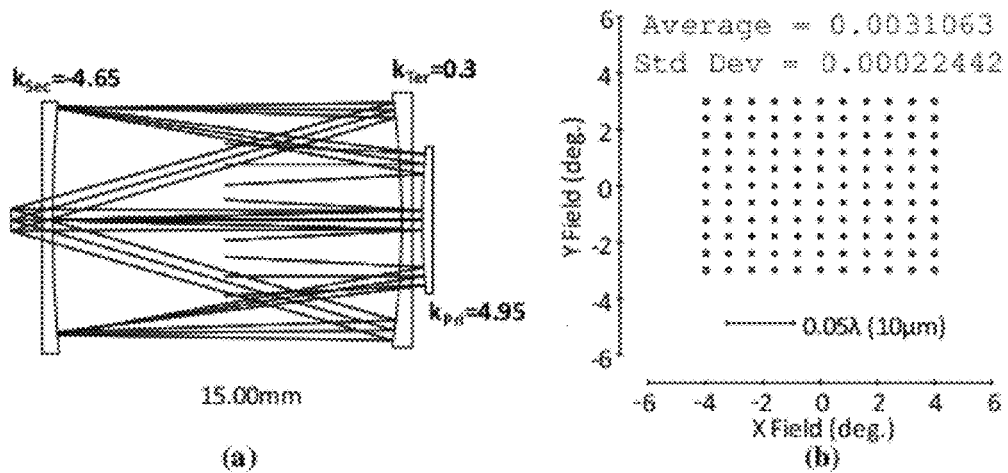
FIG. 7: (a) Optical layout for a fully obscured solution for a f/1.9, 10° full FOV LWIR imaging optical system utilizing three conic mirror surfaces; (b) A Full Field Display (FFD) of the RMS wavefront error (RMS WFE) of the optical system in (a). Each circle represents the magnitude of the RMS wavefront at a particular location in the field of view. The system exhibits a RMS WFE of λ/250 over 10° full FOV, according to an exemplary, illustrative embodiment of the invention.

The first step in the embodied design process is to design a well corrected rotationally symmetric optical form without regard to the fact that no light can pass through the system due to blockage by the components (e.g., minors) involved. This first step corrects the spherical aberration, coma, and astigmatism and creates a basic configuration with conic mirrors to minimize the use of the Zernike terms, which can challenge the testing program. FIGS. 7(*a-b*) show the results of this step for a system with aggressive goals for the f/number and FOV. The primary and tertiary minors are oblate ellipsoids, whereas the secondary minor is hyperbolic and is also the stop surface. The next step is to make this fictitious starting point design unobscured. Typically, the solution to creating an unobscured design from an obscured one is to go off-axis in aperture and/or bias the input field. It is difficult to do so with this design because the primary minor is smaller than the secondary and tertiary minors. With the knowledge that there is a path to removing axial coma by using the new design degrees of freedom, which include machining coma directly onto the surface, the novel embodied strategy is to simply tilt the surfaces until the light clears the mirrors.

Figure 8:
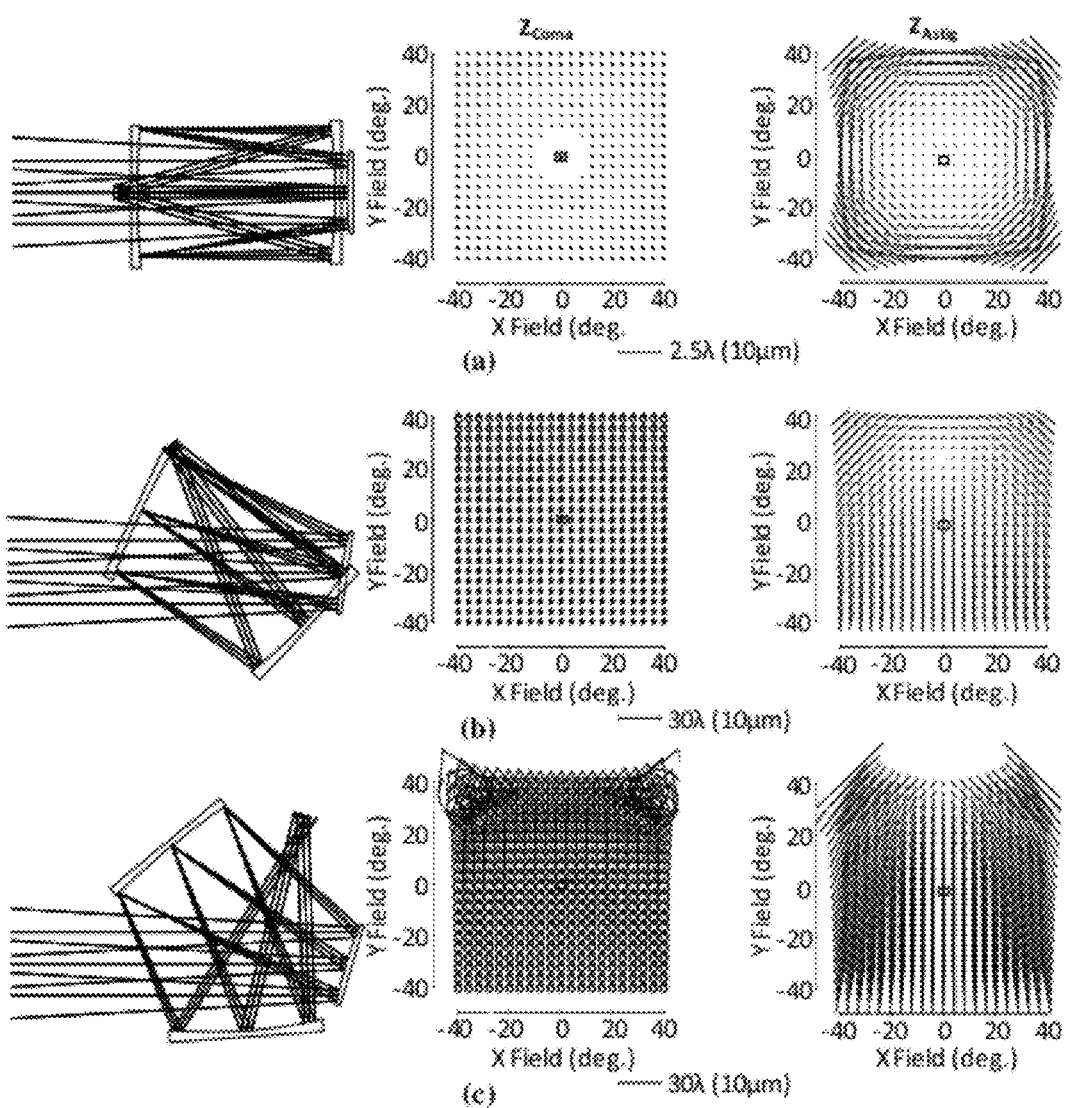
FIGS. 8(a-c): Lens layout showing Zernike coma (Z7, Z8) and astigmatism (Z5, Z6) full field displays for a ±40° FOV for the (a) on-axis optical system, (b) halfway tilted, 50% obscured system, and (c) fully tilted, 100% unobscured system. The region in red shows the field of interest, a 10° diagonal FOV, according to an illustrative aspect of the invention.

Tilting the on-axis solution will break the rotational symmetry of the system and will change where the aberration field zeros (nodes) are located for each aberration type. The shift of the aberration fields will drastically degrade the overall performance of the system. A strategy for tracking the evolution of the nodal structure as the unobscured design form is created is to oversize the field of view to many times the intended field of view. As an example of this strategy, FIGS. 8(*a-c*) show the design form at 0%, 50%, and 100% unobscured accompanied by an evaluation of Zernike coma (Z7, Z8) and Zernike astigmatism (Z5, Z6) across a ±40° field (note there is a 12× scale change between FIG. 8(*a*) and FIG. 8(*b-c*) so that the nodal behavior can be seen for each tilt position). As can be seen from FIG. 8(*a*), the on-axis solution is well corrected for astigmatism and coma within the 10° diagonal full FOV (sub-region in red) and the nodes (blue star and green dot) are centered on the optical axis (zero field). As the system is tilted halfway to an unobscured solution (FIG. 8(*b*)), the node for coma has moved immediately beyond the field being evaluated, resulting in what is a field constant coma. For this intermediate tilt, one of the two astigmatic nodes remains within the extended analysis field moving linearly with tilt. When the system is tilted to an unobscured solution (FIG. 8(*c*)), field constant coma is increased while the astigmatic node also moves out of the 8× oversized analysis field leaving the appearance of a field constant astigmatism. In the unobscured configuration the nodes have moved so far out in the field that the astigmatism and coma contributions within the region of interest, a 10° full FOV, are nearly constant.

Figure 9:
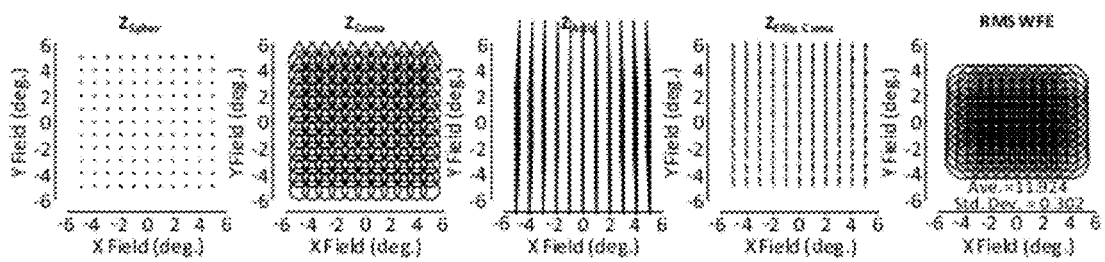
FIG. 9: The lower order spherical (Z9), coma (Z7, Z8), and astigmatism (Z5, Z6), and one higher order, elliptical coma (Z10, Z11) Zernike aberration contributions and RMS WFE FFDs over a ±5 degree field of view for the fully unobscured, on-axis solution, according to an illustrative aspect of the invention. It can be seen that the system is dominated by field constant coma and astigmatism, which are the largest contributors to the RMS WFE of ~12λ.

With a baseline unobscured system established, the next step is to use the new degrees of freedom to create a usable performance over the 10° diagonal full FOV and at an f/number that allows the use of an uncooled microbolometer (<f/2). Once the nodal evolution has been established, one can return to an analysis only over the target FOV. FIG. 9 shows that when the field performance is evaluated over a smaller field, ±5°, the field constant behavior is clearly observed for both coma and astigmatism as well as for the higher-order aberration contributions, like elliptical coma (Z10, Z11), which is now included as it affects the optical performance. It is worth noting that FIG. 9 shows that the spherical aberration (Z9) is nearly unchanged even for this highly tilted system. An evaluation of the RMS WFE is also added (far right) to determine when adequate correction is achieved. For this starting point, the RMS WFE is ~12λ at 10 μm and is predominately due to the astigmatism and coma contributions, both of which are, significantly, field constant.

Figure 10:
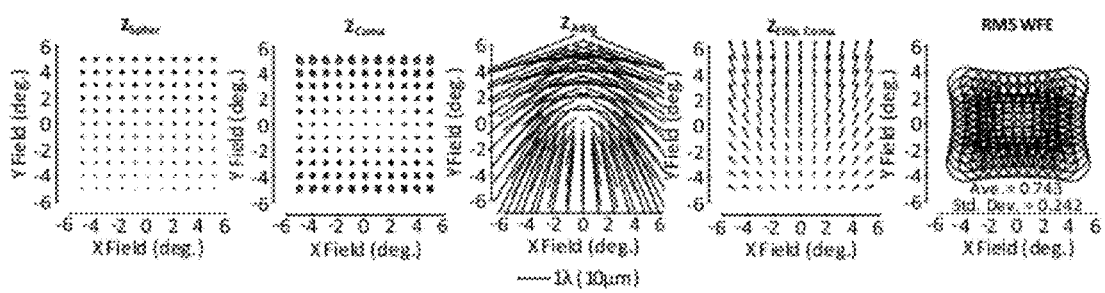
FIG. 10: The lower order spherical (Z9), coma (Z7, Z8), and astigmatism (Z5, Z6), and one higher-order, elliptical coma (Z10,Z11) Zernike aberration contributions and RMS WFE FFDs over a ±5 degree field of view for the optimized system where Zernike astigmatism and coma were used as variables on the secondary (stop) surface. When the system is optimized, the field constant contribution to astigmatism and coma are greatly reduced improving the RMS WFE from ~12λ to ~0.75λ, according to an illustrative aspect of the invention.

It is possible to correct the field constant aberrations shown in FIG. 9 based on the fact that the stop location for this optical system is the secondary mirror. When Zernike polynomials for coma and astigmatism are added as variables to the secondary conic surface, they will introduce, when optimized, the opposite amount of field constant coma and astigmatism independently, which represents a novel optical design degree of freedom. The effect of optimizing the optical system with these new variables is shown in FIG. 10, where the field constant coma and astigmatism have been removed. The RMS WFE has gone from ~12λ for the tilted system without φ-polynomials to ~0.75λ for the tilted system with Zernike coma and astigmatism on the secondary surface (note that there is a 10× scale change from FIG. 9 to FIG. 10 in order to show the residual terms in further detail).

Figure 11:
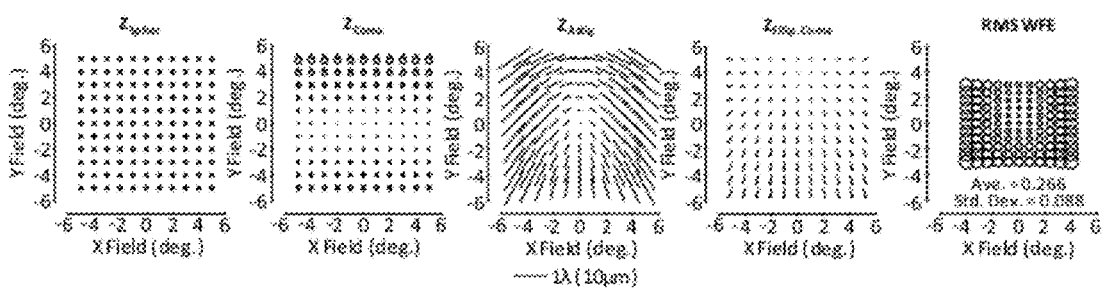
FIG. 11: The lower order spherical (Z9), coma (Z7, Z8), and astigmatism (Z5, Z6), and one higher-order, elliptical coma (Z10, Z11) Zernike aberration contributions and RMS WFE FFDs over a ±5 degree field of view for the optimized system where Zernike coma is added as an additional variable to the tertiary surface. The RMS WFE has been reduced from ~0.75λ to ~0.25λ, according to an illustrative aspect of the invention.

By studying the residual behavior of the optical system after optimization of Zernike coma and astigmatism on the secondary surface, it can be seen from the displays in FIG. 10 that the dominant aberration contribution is Zernike astigmatism, and it is the largest contributor to the RMS WFE of ~0.75λ. Moreover, the astigmatism has taken the form of field linear, field asymmetric astigmatism first described by Thompson et al. (K. P. Thompson, T. Schmid, and J. P. Rolland, "The misalignment induced aberrations of TMA telescopes," Optics Express 16 (25), 20345-20353 (2008)). Since in this case the astigmatism contribution is one of the new asymmetric forms, which is a characteristic identified by nodal aberration theory, it is necessary to apply a new type of variable to reduce or eliminate its impact. A second design aspect uses φ-polynomials away from the stop location, that is, the primary and tertiary surfaces, to counteract field dependent aberration contributions with degrees of freedom previously not available. By adding Zernike terms to these mirrors, the relationship between spherical aberration, coma, and astigmatism as a function of the conic distributions on the minors can be broken, as illustrated in FIG. 2. For example, by using a Zernike polynomial of radial order higher than Zernike astigmatism as a variable at a surface away from the stop, it will create a linear field dependent contribution to astigmatism that will reduce (and in some cases eliminate) the residual field linear, field asymmetric astigmatism. The effectiveness of this strategy is demonstrated in FIG. 11, where the relevant aberration contributions after optimization with Zernike coma on the tertiary mirror as an additional variable are shown. As can be seen from FIG. 11, which is on the same scale as FIG. 10, the astigmatism contribution has been reduced and the RMS WFE has been improved by another factor of 3× going from ~0.75λ to ~0.25λ.

With the successful creation of a nearly compliant unobscured form, the remaining optimization proceeds with additional use of low-order Zernike coefficients resulting in the system 100 shown in FIG. 4a. The overall RMS WFE over the 10° full FOV, as displayed in FIG. 4(b) is, less than λ/100 (0.01λ) 10 μm within the diffraction limit (0.07λ). As a point of comparison, if the field and f/number of the unobscured, conic-only solution presented in FIG. 8(c) are reduced to produce a diffraction limited system, the field must be reduced to a 3° diagonal full FOV and the system speed must be reduced to f/22. Thus with the φ-polynomial surface, there is a substantial advance in usable field of view in this design space, and a 3× increase when compared to the prior afocal design form. In addition, the light collection capability is extended from f/22 to f/1.9, improving signal-to-noise by two orders of magnitude, thereby enabling the transition to the use of an uncooled microbolometer.

Figure 12:
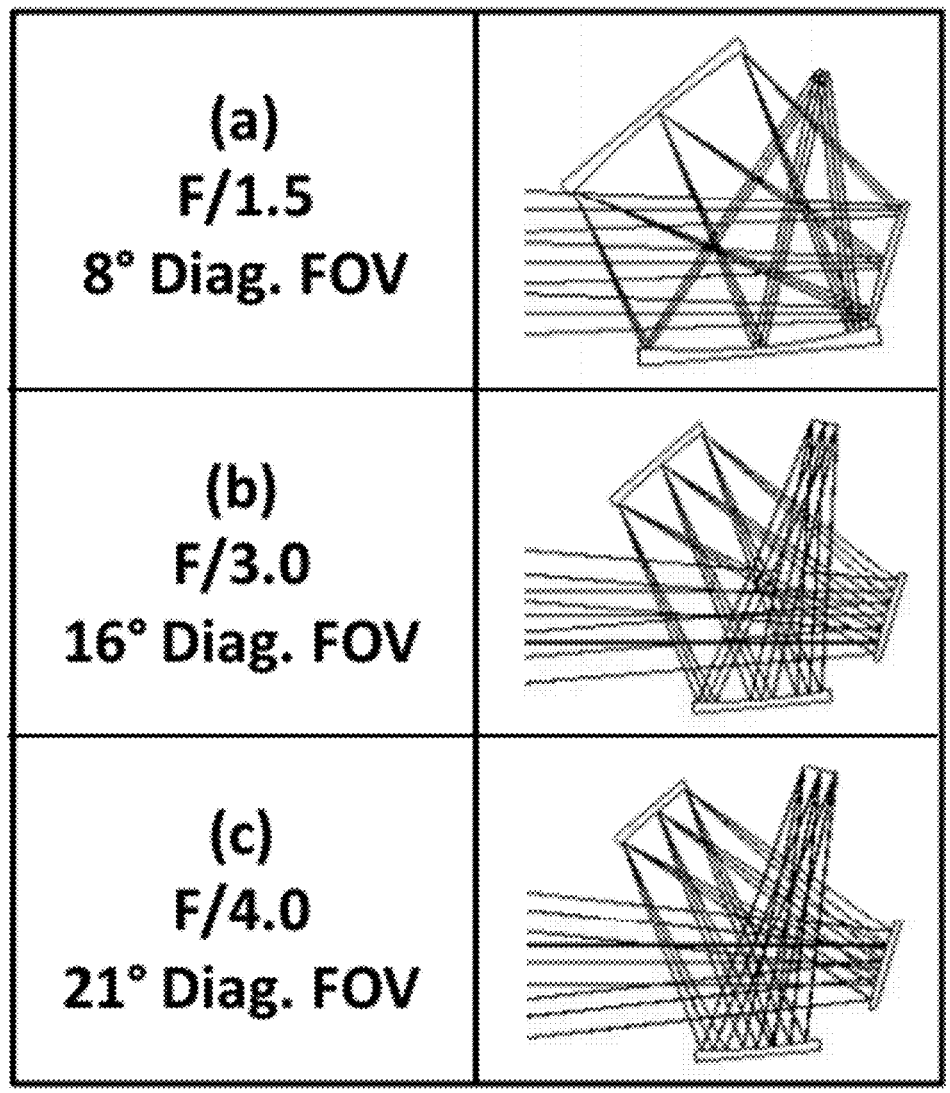
FIG. 12(a-c): Schematic optical layouts of other nonsymmetric optical system designs falling within the solution space of FIG. 6 and enabled by the embodied method, according to illustrative aspects of the invention.

FIGS. 12(a-c) schematically illustrate other system designs enabled by the embodied method, and includes three, three-minor nonsymmetric systems having a) f/1.5, 8° FOV; b) f/3.0, 16° FOV; and c) f/4.0, 21° FOV.

Figure 13:
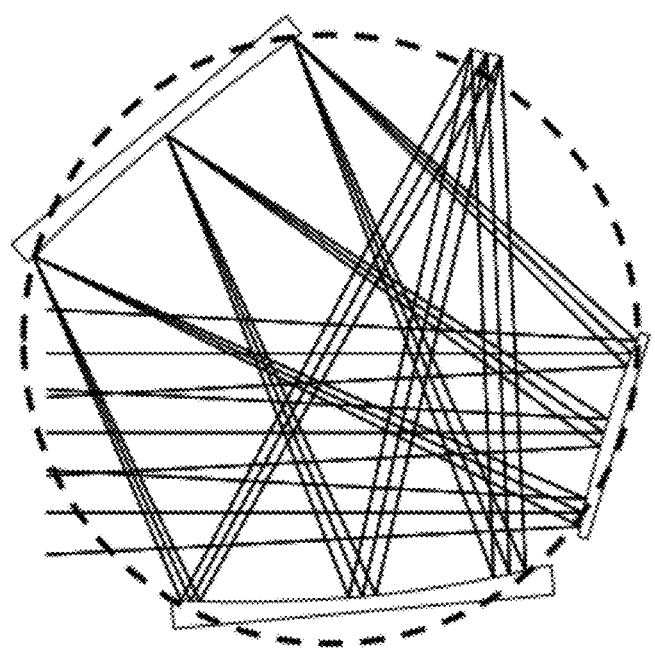
FIG. 13: Schematic diagram illustrating a maximum envelope diameter as a function of entrance pupil diameter, according to illustrative aspects of the invention.

FIG. 13 illustrates that a nonsymmetric optical system designed according to the embodied invention can fit within a linear envelope having a maximum diameter that is less than four times a maximum exit pupil diameter of the system, making for a compact optical system.

With the introduction of slow-servo diamond turning technology, a new type of optical surface, φ-polynomials, have become available for the design of optical systems, particularly SWIR to LWIR systems, and the fabrication of diffraction limited systems spanning their spectrum from about 1 to 12 μm. As the fabrication technology improves, the design strategies disclosed herein will continue to support solutions at increasingly shorter wavelengths (e.g., visible). This is a paradigm shift in optical design, allowing for the first time, truly nonsymmetric optical systems to provide diffraction limited performance over large fields of view. Using the novel optical design degrees of freedom, an exemplary three mirror system has been designed using tilted φ-polynomial surfaces that extend the usable field by an order of magnitude in area while enabling for the first time the use of an uncooled microbolometer, which requires an f/number faster than f/2.

By using the nonsymmetric aberration field analysis techniques enabled by full field displays, a strategy for the optical design based in nodal aberration theory is presented that results in an efficient path to a solution with minimum added complexity and testable surfaces.

The use of the terms "a" and "an" and "the" and similar references in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. A nonsymmetric optical system, consisting of:
three optical components each having a respective optical surface n (n=1, 2, 3),
optically coupled in a folded configuration,
wherein each surface n has a center of curvature $C_n$,
further wherein, in an unfolded configuration $C_n$ are off-axis, and
further wherein at least two of the optical surfaces are φ-polynomial surfaces.

2. The optical system of claim 1, wherein the system is a three minor imaging system characterized by $1.3 \leq f/\# \leq 4.0$ over a full diagonal field of view between 7 to 30 degrees in a spectral region from one micron (1 μm) to 12 μm.

3. The optical system of claim 2, characterized by an overall RMS wave front error less than λ/100 at 10 μm over the full field of view.

4. The optical system of claim 2, characterized by characterized by having a maximum envelope diameter that is less than four times a maximum pupil diameter of the system.

5. The optical system of claim 2, further characterized by an entrance pupil up to 75 mm.

6. A nonsymmetric optical system, consisting of:
three optical components each having a respective optical surface n (n=1, 2, 3), wherein at least two of the optical surfaces are at least one of a tilted φ-polynomial surface and a decentered φ-polynomial surface.

7. The optical system of claim 6, wherein the system is a three minor imaging system characterized by 1.3≤f/#≤4.0 over a full diagonal field of view between 7 to 30 degrees in a spectral region from one micron (1 μm) to 12 μm.

8. The optical system of claim 7, characterized by an overall RMS wave front error less than λ/100 at 10 μm over the full field of view.

9. The optical system of claim 7, characterized by having a maximum envelope diameter that is less than four times a maximum pupil diameter of the system.

10. The optical system of claim 7, further characterized by an entrance pupil up to 75 mm.

11. A nonsymmetric optical system, comprising:
three optical components each having a respective optical surface n (n=1, 2, 3), optically coupled in a folded configuration,
wherein each surface n has a center of curvature $C_n$,
further wherein, in an unfolded configuration $C_n$ are off-axis, and
further wherein at least two of the optical surfaces are φ-polynomial surfaces.

12. The optical system of claim 11, wherein the system is a three minor imaging system characterized by 1.3≤f/#≤4.0 over a full diagonal field of view between 7 to 30 degrees in a spectral region from one micron (1 μm) to 12 μm.

13. The optical system of claim 12, characterized by an overall RMS wave front error less than λ/100 at 10 μm over the full field of view.

14. The optical system of claim 12, characterized by having a maximum envelope diameter that is less than four times a maximum pupil diameter of the system.

15. The optical system of claim 12, further characterized by an entrance pupil up to 75 mm.

16. The optical system of claim 12, further comprising an uncooled image detector.

17. A nonsymmetric optical system, comprising:
three optical components each having a respective optical surface n (n=1, 2, 3),
wherein at least two of the optical surfaces are at least one of a tilted φ-polynomial surface and a decentered φ-polynomial surface.

18. The optical system of claim 17, wherein the system is a three minor imaging system characterized by 1.3≤f/#≤4.0 over a full diagonal field of view between 7 to 30 degrees in a spectral region from one micron (1 μm) to 12 μm.

19. The optical system of claim 17, characterized by an overall RMS wave front error less than λ/100 at 10 μm over the full field of view.

20. The optical system of claim 17, characterized by having a maximum envelope diameter that is less than four times a maximum pupil diameter of the system.

21. The optical system of claim 17, further characterized by an entrance pupil up to 75 mm.

22. The optical system of claim 21, further comprising an uncooled image detector.

23. A method for designing a nonsymmetric optical system, comprising:
a) generating a well-corrected, on-axis, obscured optical system having rotationally symmetric optical surfaces and a field of view;
b) tilting at least one of the optical surfaces to provide an unobscured form of the optical system;
c) determining an aberration performance including one or more dominant aberrations of the unobscured optical system over the field of view, and further determining whether the one or more dominant aberrations are field constant or field dependent; and
if the one or more dominant aberrations are field constant, then
i) adding a phi (φ)-polynomial corresponding to the one or more dominant aberrations as a variable to an optical surface at or adjacent the aperture stop of the system;
ii) optimizing the optical design;
iii) evaluating an image quality metric; and
iv) determining whether the optical system meets a performance specification and, if not, then reiterating steps (c-iv); or
if the one or more dominant aberrations are field dependent, then
v) adding a phi (φ)-polynomial corresponding to a radial order higher than the one or more dominant aberrations as variable to an optical surface that is away from the aperture stop of the system;
vi) optimizing the optical design;
vii) evaluating an image quality metric; and
viii) determining whether the optical system meets a performance
specification and, if not, then reiterating steps (c and v-viii).

24. The method of claim 23, further comprising designing an optical system including three optical components each having a respective optical surface n (n=1, 2, 3), wherein at least two of the optical surfaces are at least one of a tilted φ-polynomial surface and a decentered φ-polynomial surface.

25. The method of claim 24, further comprising designing the imaging optical system wherein the system is a three minor imaging system characterized by 1.3≤f/#≤4.0 over a full diagonal field of view between 7 to 30 degrees in a spectral region from one micron (1 μm) to 12 μm.

26. The method of claim 24, further comprising designing the imaging optical system characterized by an overall RMS wave front error less than λ/100 at 10 μm over the full field of view.

* * * * *